Nov. 16, 1971        M. L. GAYDA        3,619,990
CARBURETOR AIR FILTER UNIT
Filed June 12, 1970        2 Sheets-Sheet 1
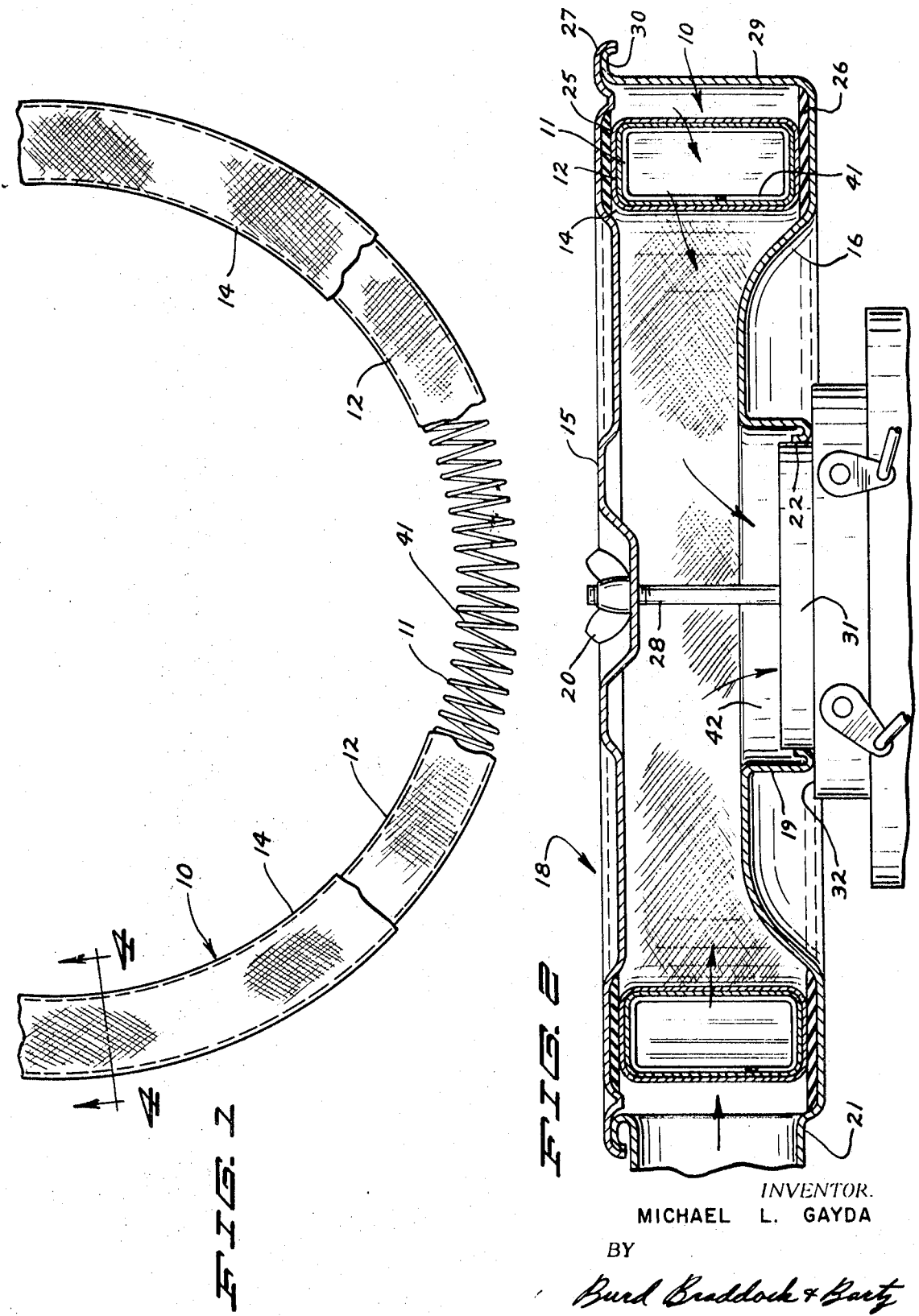
INVENTOR.
MICHAEL L. GAYDA
BY
Burd Braddock & Bartz
ATTORNEYS

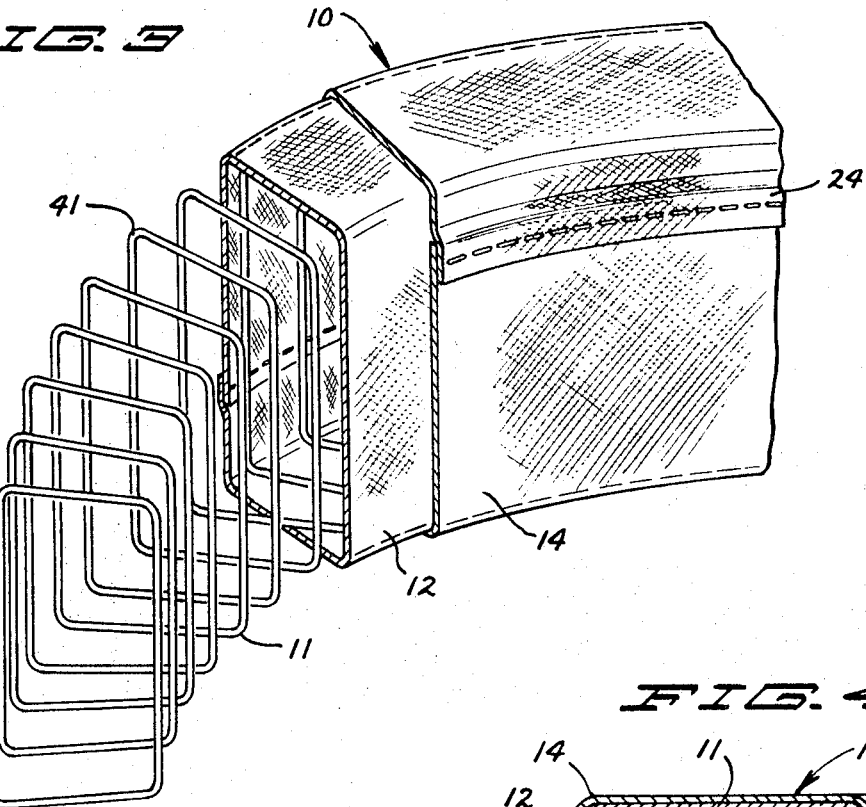
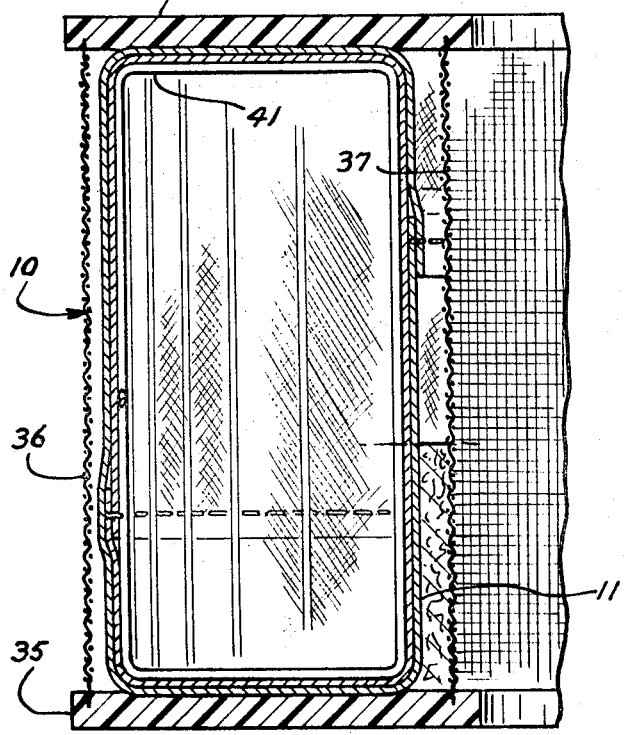
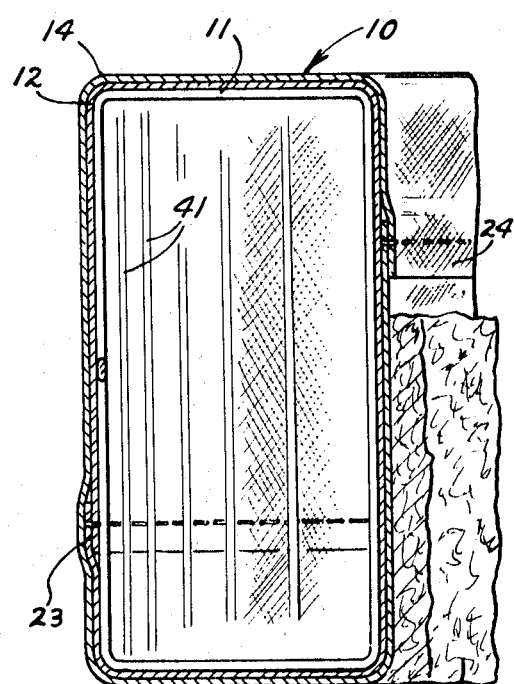
INVENTOR.
MICHAEL L. GAYDA
BY
Burd Braddock + Bartz
ATTORNEYS

3,619,990
CARBURETOR AIR FILTER UNIT
Michael L. Gayda, 11309 Kell Road,
Bloomington, Minn. 55431
Filed June 12, 1970, Ser. No. 45,731
Int. Cl. B01d 27/08
U.S. Cl. 55—482                                                                                                                          5 Claims

ABSTRACT OF THE DISCLOSURE

An improved air filter for internal combustion engines, including an annular skeleton support structure having flat top and bottom surfaces, carrying one or more enveloping filtering sleeves of a durable, close-woven fabric. The air filter is contained in an air filter housing commonly associated with automobile engines and attached to the air intake portion of the carburetor casting.

BACKGROUND OF THE INVENTION

The present invention relates to the field of air filters for internal combustion engines as, for example, an automobile engine. In operation of the internal combustion engine, gasoline and air are mixed in the carburetor in order to vaporize the gasoline and prepare it for combustion. A proper mixture of clean air and gasoline is necessary for efficient combustion. The air filter serves to cleanse the air of dirt and dust particles and the like prior to entry into the carburetor. An efficient air filter is desirable, for if the air is not properly cleansed, the same particles enter with the air into the carburetor and tend to clog its various passages. The particles pass thence to the engine valves and cylinders. Abrasive action of the particles accelerates wear on these internal engine parts. It may happen that an air filter on an engine becomes clogged, for example, with particles from the dirty air passing through, whereby the further free passage of air through the filter is inhibited. In such case, the carburetor may be deprived of adequate air, causing incomplete and inefficient combustion, and thereby adding to the polluting by-products of combustion. In addition, the excess gasoline in the cylinder may pass between the piston rings and the cylinder wall, thence to the oil in the crankcase. The presence of the gasoline in the oil dilutes the oil, reducing the lubricating ability of the oil, thereby causing greater engine wear and shortening engine life.

Conventional and prior art air filters for automobile engines commonly employ as the filtering medium a porous paper. The paper, being non-rigid, is supported within the filter by a support structure such as a wire mesh. As a filtering medium, paper is undesirable. Its lack of durability makes cleaning of the filter when dirty impractical. It must be thrown away. When a filter designed for proper air flow in dry air is subjected to an environment of high humidity, the paper swells and thus unduly restricts the free passage of air through the filter causing a fuel-air ratio which results in incomplete combustion and hence high air pollution.

Modern-day automobile engines have associated with them anti-pollution devices. Such devices commonly withdraw unburned exhaust products from the engine and recirculate said products through the air filter, thence back into the cylinders for combustion. Said products typically contain vaporized oil particles. When passing through a porous paper filtering medium of conventional air filters, many of said oil particles are trapped by the paper medium, thereby causing a clogging and swelling of the paper. The free passage of air through the filter is thereby unduly restricted, resulting in the aforementioned incomplete combustion and oil dilution.

The conventional air filter has a frame to contain the filtering medium which is commonly an annulus with perforated walls to provide for the passage of air. The air enters through the wall perforations, passes through the filtering medium supported by the necessary structure, then enters the carburetor after, perhaps, having passed through an inner perforated cylinder wall. For example, in U.S. Pat. No. 3,385,038 to Davis, there is provided a corrugated peripheral wall of porous resilient material secured to annular end members which are spaced apart by a permeable support. In U.S. Pat. No. 2,911,101 to Robinson, there is provided a cartridge element embodying a rigid tubular core having a foraminous wall, a plurality of tubular annular jackets surrounding the core, a screen cover on the outer jacket, and rigid end caps to hold together the several components of the cartridge.

In the field of filters generally, it is known to use a circular helical spring as a skeleton structure to carry a porous filtering material for the filtering of fluid fuel. For example, see U.S. Pats. 2,162,043 and 1,671,958. In these prior art structures, the sole function of the helical spring is to provide structure for the spacing apart of the layers of filtering material. The device of U.S. Pat. 2,162,043 has associated with it a hollow body having an inlet and outlet, within which the filter element is located. Likewise, there is provided in the U.S. Pat. 1,671,958 a cup-shaped casting having a fluid-tight fitting cap within which casting is contained the filtering element.

SUMMARY OF THE INVENTION

The present invention relates to an improved self-supporting air filter unit for internal combustion engines, and in particular to an air filter unit which is simple in construction, durable and reuseable. The air filter of the invention is efficient and thus aids in effecting the complete and efficient combustion of fuel in internal combustion engines, thereby resulting in more economical operation of said engines with a resultant decrease in polluting by-products from said combustion. The air filter unit of the invention is of the type generally annular in shape and is adapted to be contained in a conventional air filter housing attachable to the air intake portion of an automobile engine carburetor casting, for the filtering and cleansing of air as it passes into the carburetor.

According to the invention, there is provided an annular skeleton structure which defines flat planes at the top and at the bottom, as for example, a rectangular spring disposed in a circle so as to be endless. A filtering sleeve of durable fabric material toroidally envelops the skeleton structure. A sleeve of woven Fiberglas strands has been found effective for the purpose. One or more like filtering sleeves may be superimposed in succession upon the first filtering sleeve. Upon insertion of the filter in a conventional automobile air filter housing, flat top and bottom surfaces of the filter provided by the flat top and bottom planes of the skeleton structure constitute sealing surfaces for engagement with the facing surfaces of the filter housing.

An object of the invention is to provide a reusable, durable internal combusion engine air filter of simplified construction. A further object of the invention is to provide an efficient automobile engine air filter to aid in effecting efficient and complete combustion in the automobile engine, and thereby reduce the air pollution by said engine. A further object of the invention is to provide an improved internal combustion engine air filter unit of simplified and inexpensive construction adaptable for use in existing air filter housing in connection with conventional automobile engines. Further objects and advantages of the present invention will become apparent from the following description.

In the drawings:

FIG. 1 is a partial plan view of the air filter unit of the invention with sections cut away to further illustrate the invention;

FIG. 2 is a vertical side sectional view of the air filter unit of the invention contained in a conventional automobile engine air filter housing;

FIG. 3 is a fragmentary perspective view of the air filter unit of the invention with portions cut away to illustrate the skeleton support structure and its relationship to the filter sleeves;

FIG. 4 is an enlarged vertical sectional view taken along the line 4—4 of FIG. 1 showing a portion of an additional heat conducting wall; and FIG. 5 is a sectional view similar to FIG. 4 showing another embodiment of the invention and showing a portion of an additional heat conducting wall.

DESCRIPTION OF THE PREFERRED EMBODIMENT

Referring now to the drawings, there is shown in FIGS. 1 and 3 cut away portions of the air filter unit of the invention, indicated generally at 10. There is provided an annular skeletal support structure 11 shown to be a generally rectangular spring 41 having a circular axis so as to be endless. While other suitable skeletal support structures could be used, it is desirable that the top and bottom surfaces defined by the structure be flat and parallel to provide, when covered by fabric material, a flat surface for sealing surface engagement with a conventional air filter housing, to be described presently.

An inner sleeve 12 surrounds the support structure 11 around the entire circumference of that structure and is made from a suitable porous fabric material. Preferably, the inner sleeve 12 is made from a tightly-woven, hard-spun Fiberglas cloth, as this material provides durability, adequate porosity and is fireproof. Other materials having these attributes, or some of them, can also be used. It is free of lint which could detach from the material and enter the carburetor and is not affected by changes in the humidity. The inner sleeve 12 may be made by doubling over a piece of the fabric material and sewing together the edges with a suitable seam 23, as seen by FIG. 4.

As shown, an outer sleeve 14 circumferentially surrounds the inner sleeve 12. The outer sleeve 14 is made from a fabric material similar to that of the inner sleeve 12 and can be made in the same fashion, having a seam 24. Thus it may be seen that the skeletal support structure 11 is completely enclosed by the inner sleeve 12 which is in succession enclosed by the outer sleeve 14. The structure 11 provides not only a skeleton for the supporting of the layers of the filter fabric, but also provides rigid support for the air filter housing power.

In FIG. 2, there is shown the air filter unit of the invention disposed in filtering relationship in the air intake structure of an automobile engine carburetor. The filter unit 10 is housed in a conventional automobile air filter housing, indicated generally at 18. The air filter housing 18 is comprised of a circular cover plate 15 and a generally cylindrical lower housing 16. The lower housing 16 has a diameter greater than the outside diameter of the air filter unit 10 so that there is an air circulation space between the outer surface of the air filter 10 and a cylindrical wall 29 of the lower housing 16. On the bottom inner surface of the lower housing 16 is shown an annular gasket 26 of the same inside diameter and of a greater width than that of the air filter unit 10. The air filter unit 10 rests on the gasket 26.

The cylindrical side wall 29 of the lower housing 16 terminates at the top edge in an outwardly directed annular flange 30. The cover plate 15 has at its outer edge a circumferential flange 27 which mates with the flange 30, thus holding the cover plate 15 in the proper position covering the lower housing 16. A circumferential gasket 25 is attached to the cover plate 15 in alignment with the lower housing gasket 26, and in surface contact with the top of the filter unit 10. On one side of the lower housing 16 and through the wall 29, there is an air inlet passage 21. The bottom of the lower housing 16 has a circular opening 42 at its center for the passage of filtered air into the carburetor. From this opening 42 there depends a cylindrical collar 19 terminating in a circular inturned lip 22. The lip 22 rests on a shoulder 32 of the carburetor casting 31 which shoulder 32 surrounds the air inlet passage to the carburetor. A vertical support post 28 extends upward from the carburetor casting 31 through a center hole in the cover plate 15. A wing nut 20 is threaded on the support post 28 and holds the cover plate 15 firmly on the lower housing 16 and holds the lower housing 16 firmly on the carburetor casting. The air filter 10 is in sealing contact at its bottom surface with the lower housing gasket 26, and at the top surface with the cover plate gasket 25. To insure a tight seal between the top and bottom surfaces of the filter unit 10 with the cover plate 15 and lower housing 16, the vertical height of the wall 29 and its annular flange 30 will be such that the cover plate 15 rests on the filter unit 10 before the flange 27 seats on the flange 30.

In the use of the invention, when the automobile engine is operated, a low pressure is created at the carburetor inlet passage. Outside air is drawn into the air filter housing 18 through the air inlet passage 21. The air is circulated around the lower housing portion 16 in the space between the wall 29 and the outer edge of the air filter unit 10. The air is then drawn through the fabric layers of the air filter 10 where it is cleansed of dirt and dust particles, and the like. The clean air proceeds then into the carburetor air intake where it is mixed with the proper amount of gasoline for combustion. This cleansed air assists in efficient, low-pollution combustion of the gasoline. At such time as the air filter unit 10 becomes dirty, it can easily be removed from the air filter housing 18 by first removing the wing nut 20, then the cover plate 15. As the filtering fabric on the air filter 10 is of a durable material and well supported by the skeletal structure 11, it is readily cleaned and returned to its position in the air filter housing 18. The filtering fabric on the air filter 10 does not swell when subjected to an environment of high humidity, thereby allowing the free passage of air at all times. Nor does the fabric clog and swell upon the passage of vaporized oil particles through the filtering medium, as from an anti-pollution device. The oil particles pass freely through the filtering medium, through the carburetor to the cylinders for combustion.

In FIG. 5, there is shown a further embodiment of the invention whereby the air filter unit of the invention is incorporated into a conventional automobile air filter support structure. The air filter unit 10 is enclosed by a conventional air filter support casing comprised of an annular top plate 34 having an open center, and an annular bottom plate 35 having similarly an open center. The top plate 34 and the bottom plate 35 are connected at their outer circumference by a pervious wire mesh wall 36 and at their inner circumference by a pervious wire mesh wall 37. The air filter unit 10 repalces the conventional filtering medium such as paper or the like, and provides rigid compressive support between the top plate 34 and the bottom plate 35. The air filter unit can be easily cleaned and incorporates the other advantages of the invention, while the addition of top and bottom plates 34 and 35 and wire mesh walls 36 and 37 allow the resulting filter unit to be sold and used as a replacement of conventional filter units without any modification whatever of existing filter housing.

Air passing through a porous filtering medium, such as the filtering fabric of the filter 10, is heated in so passing by the frictional engagement of the air and the fabric, and by the contraction of the air volume as it passes through the fabric pores. Under normal operating conditions, the above mentioned heating of the air will have no effect on the operation of the engine, as the carburetor may be readily adjusted to accommodate said heating of the air. However, upon engine operation in a high temperature environment, such as on an unusually hot day, air passing through the fabric of the air filter 10 may be heated to a temperature at which the proper mixing and combusting of air and fuel are inhibited. This condition may be alleviated by causing the heated air to pass through a heat absorbing material to absorb heat from the air prior to the passage of the air into the carburetor. For example, as seen in FIGS. 4 and 5, an additional wall 33 of air filtering heat absorbing material having a high heat conductivity such as a steel wool, is adhered to the innermost filtering sleeve surface. In another embodiment, an air filtering, heat absorbing material having a high heat conductivity, such as a steel wool, could be situated inside the support structure 11 along its annular axis in sealing relationship to the inner top and bottom surfaces.

While there has been illustrated and described certain embodiments of the invention, those skilled in the art will recognize further applications of the invention with the spirit and scope of its claims which follow.

The embodiments of the invention in which an exclusive property or privilege is claimed are defined as follows:

1. An air filter including in combination with an air filter structure having a lower housing provided with an annular horizontal filter unit receiving surface, an upper housing provided with an annular horizontal filter unit receiving surface, an air inlet passageway between said housings, an air outlet passageway inside of one of said annular filter unit receiving passageways, means to fasten said housings against movement away from each other and an air filter unit positioned between the lower housing and the upper housing;
   said air filter unit including:
      an annular skeletal support structure defining a flat top plane and a flat bottom plane; and
      at least one sleeve of porous fabric material closely and toroidally surrounding the support structure to provide flat top and bottom sealing surfaces and inner and outer filter surfaces;
      said sealing surface being adapted to be held in sealing relationship to said filter unit receiving surfaces when said means is operative to fasten said housings and said unit is positioned between said housings.

2. The air filter of claim 1 wherein the sleeve of porous fabric material is a sleeve of glass fiber material.

3. The air filter of claim 1 wherein the support structure is a rectangular spring having a circular axis so as to be endless.

4. An air filter including in combination with an air filter structure having a lower housing provided with an annular horizontal filter cartridge receiving surface, an upper housing provided with an annular horizontal filter cartridge receiving surface, an air inlet passageway between said housings, an air outlet passageway inside of one of said annular filter unit receiving passageways, means to fasten said housings against movement away from each other and an air filter unit positioned between the lower housing and the upper housing;
   said air filter cartridge comprising:
      an air filter unit including an annular skeletal support structure defining a flat top plane and a flat bottom plane, and at least one sleeve of porous fabric material closely and toroidally surrounding the support structure and to provide flat top and bottom sealing surfaces and inner and outer filter surfaces;
      a top disc-shaped plate in sealing relation to said top sealing surface of said filter unit,
      a bottom disc-shaped plate in sealing relation to said bottom sealing surface of said filter unit;
      an outer pervious side wall supporting said top plate in fixed relation to said bottom plate;
      an inner pervious side wall inside of said outer wall and said filter unit and supporting said top plate in fixed relation to said bottom plate;
      said top and bottom plates being adapted to be held in sealing relationship to said filter cartridge receiving surfaces when said means is operative to hold said housings and said cartridge is positioned between said housings.

5. The air filter of claim 4 and an additional wall of air filtering material having high heat conductivity, said additional wall being situated inwardly of the outermost filter unit filtering sleeve surface and in sealing relation to said bottom and top plates.

References Cited
UNITED STATES PATENTS

| 2,693,246 | 11/1954 | Marcheck | 55—482 |
| 3,016,984 | 1/1962 | Getzin | 55—492 |
| 3,212,242 | 10/1965 | Florine | 55—510 |

FOREIGN PATENTS

| 636,407 | 4/1928 | France. |

S. LEON BASHORE, Primary Examiner

R. L. LINDSAY, JR., Assistant Examiner

U.S. Cl. X.R.

55—492, 510